United States Patent [19]

Block et al.

[11] 4,086,956

[45] May 2, 1978

[54] TEMPERATURE CONTROL OF HEAT EXCHANGER WITH BYPASS

[75] Inventors: Leo Block, Woodland Hills; Larry Ashton, Thousand Oaks, both of Calif.

[73] Assignee: Raypak, Incorporated, Westlake Village, Calif.

[21] Appl. No.: 538,641

[22] Filed: Jan. 16, 1975

[51] Int. Cl.² .......................................... G05D 15/00
[52] U.S. Cl. ..................................... 165/38; 236/34.5; 236/12 R
[58] Field of Search ...................... 165/38, 35, 37, 103; 236/20, 34.5, 93 R, 12; 122/406 R, 367 R, 367 C, 407; 237/8 C

[56] References Cited

U.S. PATENT DOCUMENTS

| 2,828,723 | 4/1958 | Miller | 122/367 R |
|---|---|---|---|
| 3,134,366 | 5/1964 | Miller | 122/407 |
| 3,203,404 | 8/1965 | Miller | 122/367 R |
| 3,292,598 | 12/1966 | Miller | 122/406 R |
| 3,630,175 | 12/1971 | Reid | 122/367 C |
| 3,684,169 | 8/1972 | Clinton | 236/20 |
| 3,920,067 | 11/1975 | Schindler | 165/38 |

Primary Examiner—Charles J. Myhre
Assistant Examiner—Margaret A. LaTulip
Attorney, Agent, or Firm—Herzig & Walsh, Inc.

[57] ABSTRACT

A heat exchanger or boiler has a bypass between the inlet and the outlet. The outlet includes a chamber having a partition with a thermostatically controlled valve, which controls flow of heating medium from the heat exchanger to the outlet connection. The thermostat maintains the temperature at the chamber. The bypass is from an inlet chamber to the space beyond the thermostat. The thermostatic valve, itself, is of a typical known construction consisting of a valve member actuated relative to a port in a plate by means of a thermostatic element axially positioned relative to the valve member. The plate forms part of a partition formed in a header member which forms a chamber at the outlet of the heat exchanger from which the heating medium flows through the thermostatic valve, to the outlet conduit. The bypass is controlled by a plate partially obstructing a passageway and it may be flexible to respond to flow of medium to have a throttling effect.

14 Claims, 5 Drawing Figures

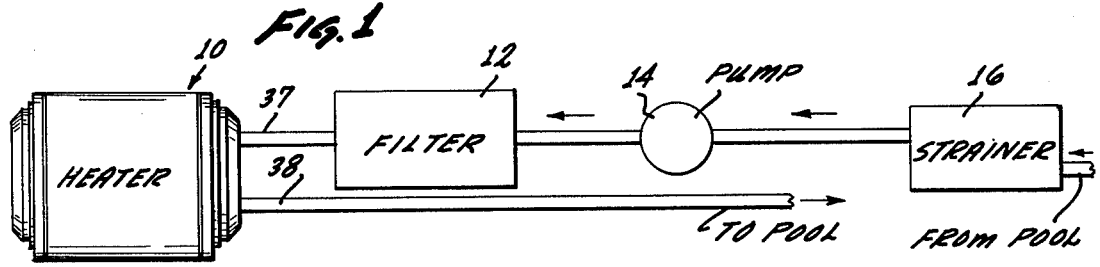
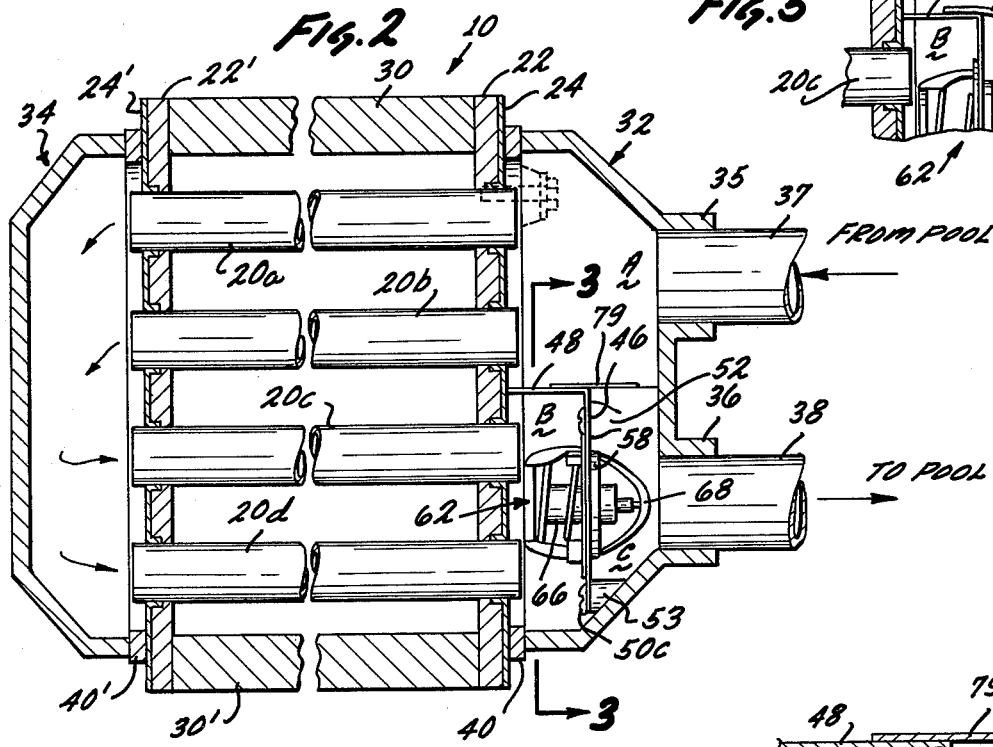
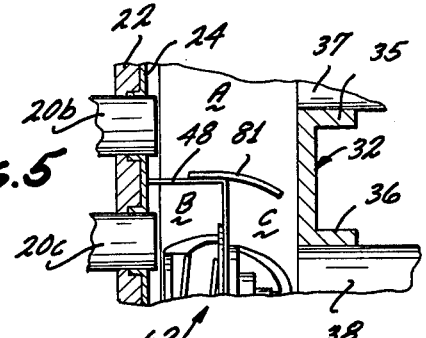
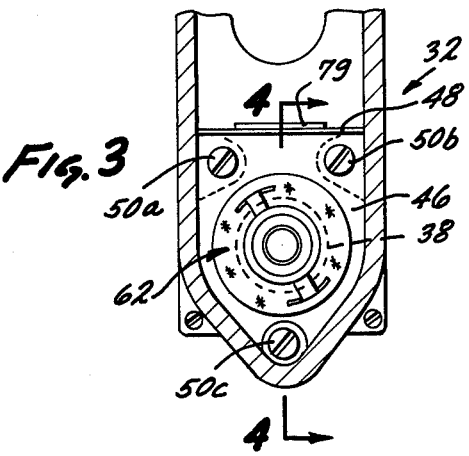
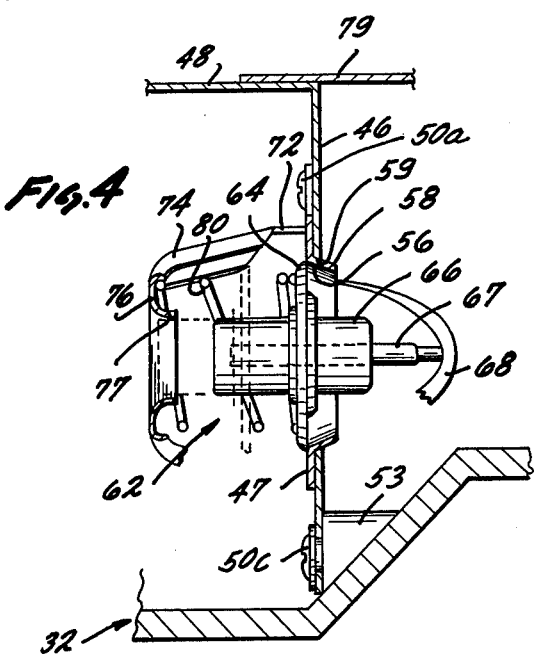

TEMPERATURE CONTROL OF HEAT EXCHANGER WITH BYPASS

BACKGROUND OF THE INVENTION

1. Field of the Invention

The field of the invention is that of control of heat exchangers or boilers, more particularly that type of apparatus when there is a bypass between the inlet and the outlet. Heaters or boilers of typical types are provided with tubes extending between tube sheets with headers at the end of the tubes. The control of the invention is adapted in this type of construction, more particularly wherein there is a bypass between the inlet and the outlet of the heat exchanger.

2. Description of the Prior Art

Heat exchangers or boilers having a bypass between an inlet and an outlet and thermostatic means for controlling flows are common and typical of the prior art. With respect to thermostatically controlled heat exchange systems, reference may be had to the following U.S. Pat. Nos: 1,985,929; 2,211,573; 2,224,240; 2,419,630; 3,751,156; 2,884,197; 3,027,088; 3,148,828; 3,134,366; and 3,224,675.

SUMMARY OF THE INVENTION

In a preferred exemplary form of the invention as described in detail herein, it is adapted in a tube type heat exchanger or boiler particularly adapted for heating swimming pool water. The heat exchanger or boiler is provided with headers at the opposite ends of the tubes. Water inlet and outlet conduits connect to one of the headers. Within the latter header there is provided a partition which provides a chamber on one side which receives heated water coming from the heat exchanger and a second chamber on the other side with which the outlet conduit communicates. A bypass passageway is provided from the inlet part of the said one header, to said second chamber, so that inlet water or heating medium can mix with water in the said second chamber.

The partition may be formed simply of sheet metal. The partition has a valve port in it and mounted to control the port is a simplified type of thermostatic control device embodying a valve, a coaxial thermostatic element and a biasing spring.

The thermostatic element operates to control the temperature in the said first chamber as the water is being delivered to the outlet conduit. Preferably a simplified control is provided for controlling the bypass simply in the form of either a rigid or spring loaded member, which may be simply a flexible metal strip which deflects in response to the flow of water controlling the bypass passage accordingly.

In the light of the foregoing, the primary object of the invention is to provide a simplified control for heat exchangers as described wherein there is a bypass between the inlet and the outlet, the control being constructed to control the temperature of the medium coming out of the heat exchanger with this water then mixing with water flowing through the bypass.

A further object is to provide a control as described wherein the bypass is not thermostatically controlled but is controlled by a spring loaded member that responds to flow conditions.

A further object is to provide a control as in the foregoing wherein the bypass is provided with a spring loaded control member simply in the form of a flexible metal plate which flexes in response to flow.

A further object is to provide a control as described which is realized by way of providing a partition member in a header associated with a heat exchanger, the partition including a plate having a valve port in it with a simplified thermostatic control valve of the type having a valve member with a concentric thermostatic element and concentric biasing spring associated with the port in the plate.

Further objects and additional advantages of the invention will become apparent from the following detailed description and annexed drawings wherein:

FIG. 1 is a schematic view of a pool heating system in which the invention may be embodied;

FIG. 2 is a sectional schematic view of a heat exchanger or boiler such as may be used in the system of FIG. 1 having the invention embodied therein;

FIG. 3 is a sectional view taken along the line 33 of FIG. 2;

FIG. 4 is an enlarged view of the partition and thermostatic control valve of FIG. 2;

FIG. 5 is a partial sectional view of a modified form of the invention.

DESCRIPTION OF PREFERRED EMBODIMENT

Numeral 10 designates a heat exchanger or boiler which is shown in cross-section in FIG. 2. Numeral 12 designates a filter and numeral 14 a circulating pump, numeral 16, designating a strainer. These elements are connected by conduits for flow in the direction indicated by the arrows for providing heated water to a pool not shown. The return from the pool is to the strainer 16.

The heater 10 may have a construction as shown schematically in FIG. 2. Numerals 20a, b, c and d designate heat exchange tubes mounted between tube sheets 22 and 22' which may be of typical construction. The tube sheets may have metal cladding as designated at 24 and 24'. The tube sheets and parts 30–30' form part of an enclosure which may be part of a combustion chamber or associated with a combustion chamber for transfer of heat to the tubes.

Numeral 32 designates a header at one side of the heat exchanger and numeral 34 designates a header at the other side or the other end of the tubes.

Header 32 has bosses 35 and 36 which receive an inlet conduit 37 and an outlet conduit 38. Header 32 is associated with the tube sheet 22 in a conventional manner and this construction may include a gasket schematically shown at 40.

Within the header 32 there is shown a partition 46 which may be made of sheet metal. It has a right angle portion 48 which seals with the cladding 24 of tube sheet 22. The partition member or plate 46 is mounted by way of screws 50a, b and c. which engage in posts, two of which are shown at 52 and 53, in FIG. 4. The plate 46 has in it a port 56 with a tapering skirt 58 as may be seen in FIG. 4.

Numeral 62 designates a thermostatic assembly which preferably is of a simplified type such as in ordinarily used as an automobile The valve member is in the form of a disc as designated at 64 cooperating with port 58. The thermostatic element is a cylindrical element as designated at 66 being coaxial with the valve member 64 and extending through it as shown. The thermostatic element has an extending stem 67 which attaches to an arcuate brace or support member 68 which is integral and extends from the skirt 58. The valve port 56 is formed in plate 47 which is spot welded to plate 46, skirt 58 extending through hole 59 in plate 46. Numeral 72 designates a ring member that is integral with the plate 47 and from which extends a support frame 74 having a ring shaped part 76, with a skirt part 77 which extends to the right in FIG. 4, the end part 76 forming a retainer for a coil spring 80, the right end of which bears against the biases the valve member 64. As may be seen the thermostatic assembly is a unitary one installed simply by spot welding plate 47 to partition plate 46.

Numeral 79 designates a flat stiff plate member secured to the partition 48 and which extends out towards the wall of the header 32 as to partially obstruct the passageway between inlet chamber A and chamber C, which receives heating medium through the valve, from chamber B.

Header 34 provides communication between the ends of tubes 20a and b and tubes 20c and d.

FIG. 5 shows a modified form of the invention wherein the member 81 is not a rigid plate but which is a strip of flexible sheet metal which can flex in response to pressure or flow of liquid acting on it, as will be described more in detail presently.

OPERATION

The exemplary form of the invention is described as a heat exchanger for heating swimming pool water. The return from the pool is through conduit 37 and the flow to the pool is through the conduit 38. Typically, it is desired to maintain the temperature in the heat exchanger outlet chamber B at a temperature of 105° F. A higher temperature would accentuate the formation of scale in the tubes because of many chemicals present in pool water. A temperature substantially below 105° F would tend to cool the combustion products below their condensation point, resulting in precipitation of water drops that would be flowing on the surface of the burner and impeding combustion and resulting in the formation of carbon monoxide.

Typically the temperature of the water going to the pool from chamber C will be in the range of 80°–90° F, considering that the inlet water temperature, that is the water coming from the pool in Chamber A is in the 75° range. Obviously, if the inlet water from the pool is at a lower temperature, the water going to the pool will be at a lower temperature after mixing. This may occur at the start of the pool heating season before the pool water temperature has been brought up to normal. During the initial heating period, the 105° temperature is nevertheless maintained in Chamber B. There are provided bypass holes in the partition plate 46 50 that as soon as flow starts, water which has been heated can pass the thermostat and go through the holes to give it a chance to respond. When there is no flow, the water around the thermostatic element would be cold so that it cannot respond. Immediately upon starting of the pump flow begins so that the cold water collected around the thermostatic element passes out through the holes. It is displaced by hot water that was heated in the tubes. In this manner a faster response of the thermostatic element is obtained.

The plate 79 in FIG. 2 limits the amount of water flowing through the bypass, the size of the bypass being fixed. It is to be observed that this construction is realized in an extremely simplified and economical but effective way. The partitions may be formed simply of sheet metal, partition 46 having the port for the conventional thermostatic assembly as described.

In the embodiment of FIG. 5, throttling control of the bypass is realized in an extremely simple but effective way. Plate 81 responds and flexes in response to the pressure exerted on it. Typically, a major portion of the water may flow through the bypass. An increasing flow of liquid through the heater will mean a greater pressure drop and a greater inlet pressure, which will cause the strip of metal 81 to deflect more and allow more water to flow through the bypass and mix with the water at 105° F coming from the heat exchanger.

The foregoing disclosure is representative of a preferred form of the invention and is to be interpreted in an illustrative rather than a limiting sense, the invention to be accorded the full scope of the claims appended hereto.

What is claimed is:

1. In a flow governor system adapted for controlling a heat exchanger of a type having a fluid inlet and a fluid outlet with bypass means from the inlet to the outlet, the improvement comprising in combination, means forming an enclosure for receiving heated fluid and having a valve port, a valve member for controlling said valve port, temperature responsive means responsive to temperature of fluid from the heat exchanger for adjusting said valve member, and means forming a bypass port providing communication to the downstream side of said valve port of fluid from said inlet which mixes with fluid downstream of said valve port passing to said fluid outlet, said means forming a bypass port being constructed to provide for flow independently of said temperature responsive means.

2. Flow governing means as in claim 1, including a plate extending partially across the bypass port.

3. Flow governing means as in claim 2, wherein said plate is constructed to be able to flex when fluid impinges on it whereby to adjust the size of the bypass port.

4. Flow governing means as in claim 1, wherein said heat exchanger is of a tube type having headers, one of said headers having partition means forming said enclosure and including a part having said valve port therein.

5. Flow governing means as in claim 4, wherein said partition part has an opening therein, a bracket member secured over said opening, and having said valve port in it and said valve member and temperature responsive means being carried by the said bracket in a manner to control the said valve port.

6. Flow governing means as in claim 5, wherein said bracket has extending means positioned to support said temperature responsive means.

7. Flow governing means as in claim 5, including said partition having a portion extending partially between side walls of the header and a plate extending partially across the bypass port towards a wall of said one header.

8. Flow governing means as in claim 7, wherein said plate is constructed to be able to flex when fluid impinges on it whereby to throttle the bypass port.

9. Flow governing means as in claim 8, wherein said partition means is formed of sheet metal secured within a part of said one header.

10. Flow governing means as in claim 4, the said temperature responsive means comprising a unitary assembly including a support bracket, valve member, biasing spring, a thermostatic element coaxial with the valve member and support means carried by the bracket, and the said bracket being secured to the said partitioned part with the valve member cooperating with the valve port.

11. Flow governing means as in claim 10, wherein the support means of the thermostatic means includes a retainer for one end of the biasing spring, a stem extending from the thermostatic element, the stem being secured to a part of the said support means.

12. In a flow governor system adapted for controlling a heat exchanger of a type having a fluid inlet and a fluid outlet with bypass means from the inlet to the outlet, the heat exchanger including a header having the fluid inlet and the fluid outlet connected thereto, the improvement including sheet metal means positioned within the header to form a partition between the outlet from the heat exchanger and the said fluid outlet from the header, said partition having a port therein and a thermostatic valve mounted to be carried by the said partition and controlling the said port, the thermostatic valve being responsive to temperature of fluid from the heat exchanger.

13. A system as in claim 12, wherein the said heat exchanger is a type having tube sheets with tubes extending between the tube sheets, the said header having an open side which is secured to one of the tube sheets.

14. A system as in claim 12, including an additional sheet metal member positioned to control bypass flow directly from said fluid inlet to said fluid outlet.

* * * * *